US011192244B2

(12) United States Patent
Nakamura et al.

(10) Patent No.: US 11,192,244 B2
(45) Date of Patent: Dec. 7, 2021

(54) ROBOT SYSTEM, ROBOT CONTROLLER, AND METHOD FOR WITHDRAWING ROBOT

(71) Applicant: KABUSHIKI KAISHA YASKAWA DENKI, Kitakyushu (JP)

(72) Inventors: Tamio Nakamura, Kitakyushu (JP); Tetsuro Izumi, Kitakyushu (JP); Takashi Nishimura, Kitakyushu (JP); Shohei Ohno, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 492 days.

(21) Appl. No.: 16/160,977

(22) Filed: Oct. 15, 2018

(65) Prior Publication Data
US 2019/0126476 A1    May 2, 2019

(30) Foreign Application Priority Data
Oct. 31, 2017   (JP) .............................. JP2017-210865

(51) Int. Cl.
*B25J 9/16*    (2006.01)
(52) U.S. Cl.
CPC .......... *B25J 9/1633* (2013.01); *B25J 9/1676* (2013.01); *B25J 9/1694* (2013.01);
(Continued)
(58) Field of Classification Search
CPC ...... B25J 9/1633; B25J 9/1694; B25J 9/1676; G05B 2219/40582; G05B 2219/40202;
(Continued)

(56) References Cited

U.S. PATENT DOCUMENTS 8,281,670 B2 *   10/2012   Larkin ................... A61B 34/37
                                                      73/862.045
9,737,989 B2    8/2017   Naitou et al.
(Continued)

FOREIGN PATENT DOCUMENTS

JP    H02-076691 A    3/1990
JP    11-277483       10/1999
(Continued)

OTHER PUBLICATIONS

Japanese Office Action for corresponding JP Application No. 2017-210865, dated Jan. 14, 2020 (w/ machine translation).
(Continued)

*Primary Examiner* — Abby Y Lin
*Assistant Examiner* — Danielle Marie Jackson
(74) *Attorney, Agent, or Firm* — Mori & Ward, LLP

(57) ABSTRACT

A robot system includes a robot, a sensor, and a processor. The sensor is configured to detect an external force acting on the robot. The processor is configured to move the robot in a forward direction such that a representative point of the robot moves along a motion track in the forward direction; move the robot in a reverse direction such that the representative point moves along the motion track in the reverse direction opposite to the forward direction when the external force satisfies a first condition which includes a condition that the external force is larger than a first threshold force; and move the robot to reduce the external force when the external force satisfies a second condition which includes a condition that the external force is larger than a second threshold force even after the robot has been moved in the reverse direction.

17 Claims, 8 Drawing Sheets

(52) U.S. Cl.
CPC .............. *G05B 2219/40202* (2013.01); *G05B 2219/40559* (2013.01); *G05B 2219/40582* (2013.01)

(58) Field of Classification Search
CPC .......... G05B 2219/40559; G05B 2219/40224; G05B 2219/40426; G05B 2219/39529; G05B 2219/40198
See application file for complete search history.

(56) References Cited

U.S. PATENT DOCUMENTS

| | | | |
|---|---|---|---|
| 10,464,210 B2* | 11/2019 | Haddadin | B25J 13/085 |
| 2012/0048027 A1 | 3/2012 | Hashiguchi et al. | |
| 2014/0121837 A1 | 5/2014 | Hashiguchi et al. | |
| 2014/0142754 A1* | 5/2014 | Dai | B25J 9/16 700/245 |
| 2015/0367510 A1 | 12/2015 | Naitou et al. | |
| 2016/0207197 A1* | 7/2016 | Takahashi | B25J 9/1676 |
| 2016/0214261 A1 | 7/2016 | Davis et al. | |
| 2016/0243705 A1 | 8/2016 | Naitou et al. | |
| 2017/0066139 A1* | 3/2017 | Corkum | B25J 15/04 |
| 2017/0266815 A1* | 9/2017 | Takeuchi | G05B 19/423 |
| 2018/0079090 A1* | 3/2018 | Koenig | B25J 18/04 |

FOREIGN PATENT DOCUMENTS

| | | |
|---|---|---|
| JP | 2011-201009 A1 | 10/2011 |
| JP | 2012-51042 | 3/2012 |
| JP | 2016-153156 | 8/2016 |

OTHER PUBLICATIONS

Extended European Search Report for corresponding EP Application No. 18196844, dated Mar. 26, 2019.
European Office Action for corresponding EP Application No. 18196844.7-1205, dated Apr. 16, 2021.
Chinese Office Action for corresponding CN Application No. 201811257753.5, dated Jul. 2, 2021 (w/ English machine translation).

* cited by examiner

| Identification number | External force value | Motion amount |
|---|---|---|
| A0 | 0 | m0 |
| A1 | 200 | m1 |
| A2 | 50 | m2 |
| A3 | 0 | m3 |
| A4 | 100 | m4 |
| A5 | 0 | m5 |

ROBOT SYSTEM, ROBOT CONTROLLER, AND METHOD FOR WITHDRAWING ROBOT

CROSS-REFERENCE TO RELATED APPLICATIONS

The present application claims priority under 35 U.S.C. § 119 to Japanese Patent Application No. 2017-210865, filed Oct. 31, 2017. The contents of this application are incorporated herein by reference in their entirety.

BACKGROUND

Field of the Invention

The present invention relates to a robot system, a robot controller, and a method for withdrawing a robot.

Discussion of the Background

Some robots known in the art change posture by operating a plurality of rotation axes. Such robot includes a tool at the leading end of the robot. The tool varies depending on the application in which the robot is used, such as suction and holding, so that the robot is capable of performing various kinds of work such as holding and moving a workpiece.

JP 2012-051042A discloses a robot system that includes a robot of the above kind and a sensor provided in the robot. The sensor detects a contact of an obstacle with the robot in an attempt to reduce the external force of the obstacle on the robot.

SUMMARY

According to one aspect of the present disclosure, a robot system includes a robot, a sensor, and a processor. The sensor is configured to detect an external force acting on the robot. The processor is configured to move the robot in a forward direction such that a representative point of the robot moves along a motion track in the forward direction; move the robot in a reverse direction such that the representative point moves along the motion track in the reverse direction opposite to the forward direction when the external force satisfies a first condition which includes a condition that the external force is larger than a first threshold force; and move the robot to reduce the external force when the external force satisfies a second condition which includes a condition that the external force is larger than a second threshold force even after the robot has been moved in the reverse direction.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a robot system, a robot controller, and a method for withdrawing a robot according to embodiments of the present invention will be described in detail below. It is noted that the following embodiments are provided for example purposes only and are not intended for limiting purposes.

Also in the following description, terms such as "orthogonal", "perpendicular", "parallel", and "vertical" may not necessarily be used in a strict sense. That is, these terms are used with production-related and installation-related tolerances and errors taken into consideration.

Figure 1:
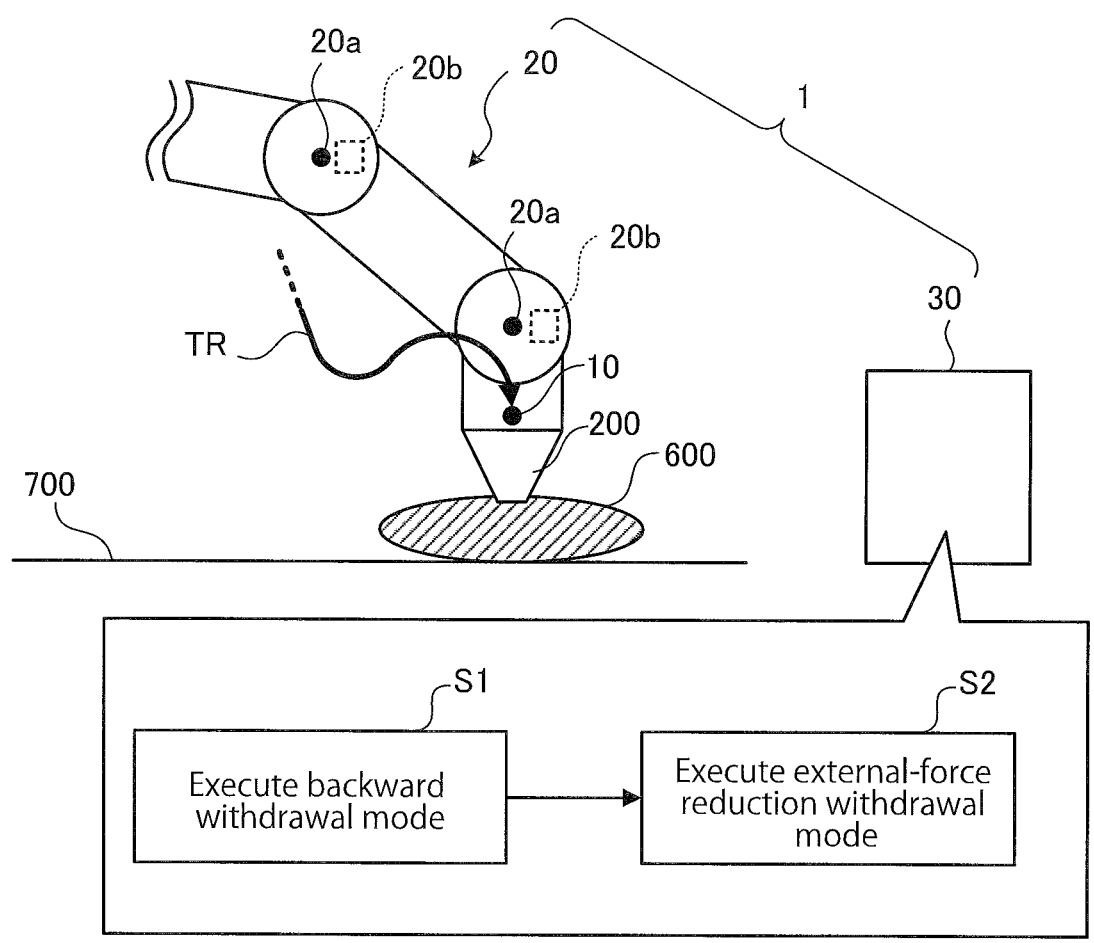
FIG. 1 illustrates an outline of a robot system according to an embodiment.

A robot system 1 according to this embodiment will be outlined by referring to FIG. 1. FIG. 1 illustrates an outline of a robot system 1 according to this embodiment. Specifically, FIG. 1 illustrates: part of a robot 20 with a tool 200 mounted on the leading end of the robot 20; and a robot controller (a processor) 30, which controls motions of the robot 20.

As illustrated in FIG. 1, the robot 20 includes a plurality of motion axes 20a and a detector (a force sensor) 20b. The detector 20b detects external force on each of the motion axes 20a. That is, the detector 20b detects external force acting on the robot 20. A non-limiting example of each motion axis 20a is a rotational motor. Examples of the detector 20b include, but are not limited to, an encoder of a rotational motor and a sensor such as a torque sensor. In this embodiment, the robot 20 is caused to move by rotational motors. In another possible embodiment, the motion axes 20a may include a linear motion actuator such as a linear motion motor.

Also in FIG. 1, a representative point 10 of the robot 20 is illustrated. The representative point 10 refers to an imaginary point for the robot controller 30 to control motions of the robot 20. Specifically, the robot controller 30 controls a motion of the robot 20 so that the representative point 10 follows a predetermined motion track TR. While in FIG. 1 the representative point 10 is located on the outer shape of the robot 20, the representative point 10 may be located outside the outer shape of the robot 20, such as on the outer shape of the tool 200 and any of other positions.

As illustrated in FIG. 1, assume that an object 600 is held between the tool 200 and a floor surface 700 as a result of the robot 20 having followed the motion track TR. In this case, the robot controller 30 controls the robot 20 to take a motion to release the holding, that is, take a withdrawal motion. When the robot 20 takes a withdrawal motion, it is preferable for the robot 20 to reliably release the holding while avoiding interference with some other obstacles after and/or during the motion to release the holding of the object 600.

In light of the circumstances, in the robot system 1 according to this embodiment, the robot controller 30 executes "backward withdrawal mode" when a "first condition" is satisfied. In the "backward withdrawal mode", the robot controller 30 controls the robot 20 to withdraw by following, in the backward direction, the motion track TR that the robot 20 followed (see step S1 illustrated in FIG. 1).

The backward withdrawal mode is employed under the assumption that, with the object 600 being the first obstacle to contact for the robot 20, the robot 20 contacted no other obstacles during the period of time for which the robot 20 was following the motion track TR while changing posture. Thus, by causing the robot 20 to withdraw by following the motion track TR in the backward direction, the possibility of the robot 20 contacting other obstacles is minimized.

The movement distance over which the robot 20 follows the motion track TR in the backward direction and the movement period of time for which the robot 20 follows the motion track TR in the backward direction can be determined in advance. For example, it is possible to regulate the movement distance to some centimeters or regulate the movement period to some seconds. The "first condition" will be described in detail later by referring to FIG. 5.

Also in the robot system 1 according to this embodiment, the robot controller 30 executes "external-force reduction withdrawal mode" when the execution situation of the backward withdrawal mode satisfies a "second condition". In the external-force reduction withdrawal mode, the robot controller 30 controls the robot 20 to withdraw in a direction in which the external force detected by the detector 20b reduces (see step S2 illustrated in FIG. 1).

In the external-force reduction withdrawal mode, the robot controller 30 determines one detector 20b, among a plurality of detectors 20b, that detected the largest external force. Then, the robot controller 30 controls the robot 20 to move the motion axis 20a corresponding to the one detector 20b in a direction in which the largest external force reduces. Thus, as necessary, the robot controller 30 shifts the backward withdrawal mode to the external-force reduction withdrawal mode in order to improve the holding release reliability. The "second condition" will be described in detail later by referring to FIG. 6.

Thus, the robot system 1 according to this embodiment makes the withdrawal motion of the robot 20 more reliable while eliminating or minimizing interference with other obstacles. While in FIG. 1 the object 600 is held between the floor surface 700 and the tool 200 mounted on the robot 20, this configuration is not intended in a limiting sense.

The withdrawal motion also applies to, for example, the case where the object 600 is held between the tool 200 and a wall surface or a ceiling surface, the case where the object 600 is held between the tool 200 and some other obstacle, and the case where the object 600 is held between arms of the robot 20. The object 600 may be a substance or a human being.

In the robot system 1 according to this embodiment, it is possible to execute "reflective withdrawal mode", which is to cause a motion axis 20a to make a withdrawal motion before the robot controller 30 determines to do so. This will be described later by referring to FIGS. 3, 4A, and FIG. 7.

Figure 2:
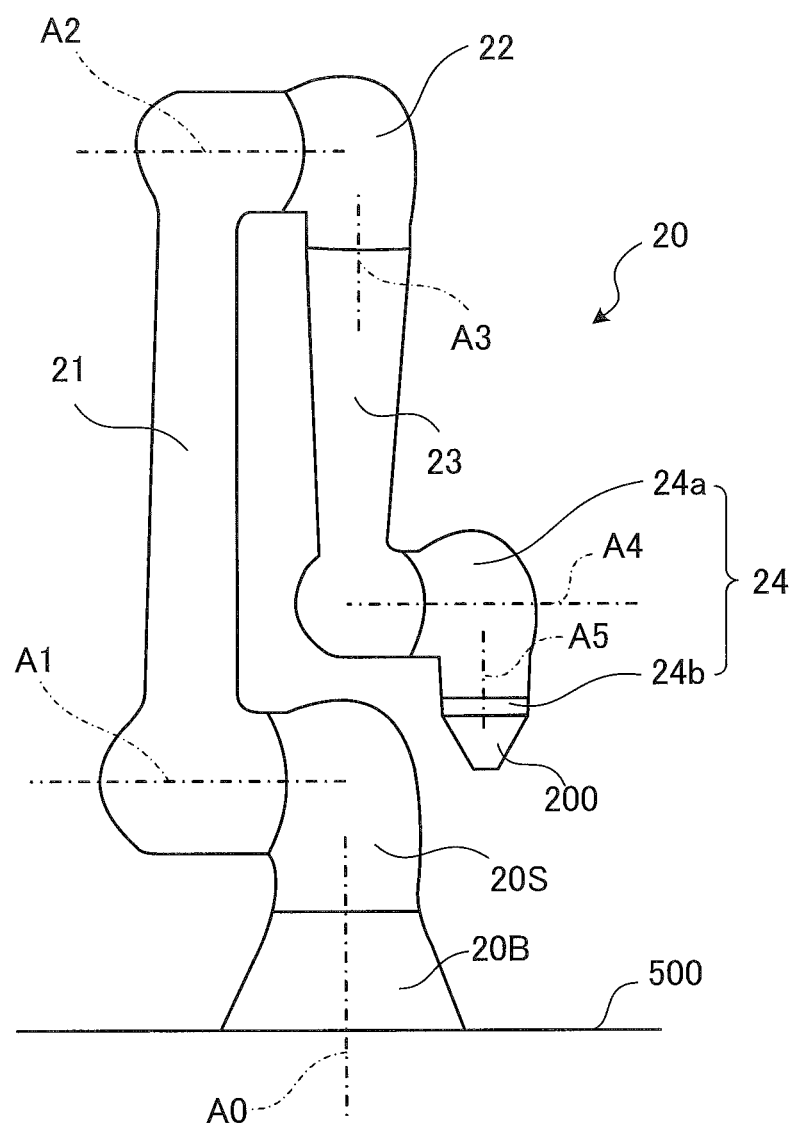
FIG. 2 is a side view of a configuration of a robot.

An example configuration of the robot 20 will be described by referring to FIG. 2. FIG. 2 is a side view of a configuration of the robot 20. The robot 20 is a "collaborative robot". A collaborative robot has a smooth texture and secures sufficient gaps between movable parts of the robot such as arms to prevent human body parts from becoming caught between movable parts of the robot.

The robot 20 has an internal space extending between the base end and the leading end of the robot 20. The internal space contains cables for the tool 200 and other cables and/or wires. This ensures that these cables and wires do not interfere with direct teaching of the robot 20 and work performed by the robot 20.

As illustrated in FIG. 2, the robot 20 is a "vertical multi-articular robot" having six axes, namely, vertical axis A0, first axis A1, second axis A2, third axis A3, fourth axis A4, and fifth axis A5. The robot 20 includes (in increasing order of distance from the base end) a base 20B, a turnable portion 20S, a first arm 21, a second arm 22, a third arm 23, and a wrist 24.

The base 20B is fixed to an installation surface 500 such as a floor. The turnable portion 20S is supported by the base 20B and is turnable about the vertical axis A0, which is perpendicular to the installation surface 500. The first arm 21, at its base end, is supported by the turnable portion 20S and is turnable about the first axis A1, which is perpendicular to the vertical axis A0. The second arm 22, at its base end, is supported by the leading end of the first arm 21 and is turnable about the second axis A2, which is parallel to the first axis A1.

The third arm 23, at its base end, is supported by the leading end of the second arm 22 and is turnable about the third axis A3, which is perpendicular to the second axis A2. The wrist 24 includes a base end 24a and a leading end 24b. The base end 24a, at its base end, is supported by the leading end of the third arm 23 and is turnable about the fourth axis A4, which is perpendicular to the third axis A3.

The leading end 24b, at its base end, is supported by the leading end of the base end 24a and is turnable about the fifth axis A5, which is orthogonal to the fourth axis A4. At the leading end of the leading end 24b, the tool 200 is detachably attached. Examples of the tool 200 include, but are not limited to, a holding tool and a suction tool.

It is to be noted that each of the vertical axis A0, the first axis A1, the second axis A2, the third axis A3, the fourth axis A4, and the fifth axis A5 has one motion axis 20a and one detector 20b illustrated in FIG. 1. That is, the robot 20 is capable of detecting external force acting on each of the axes. It is to be noted that the motion axis 20a and the detector 20b may be provided on the tool 200.

Figure 3:
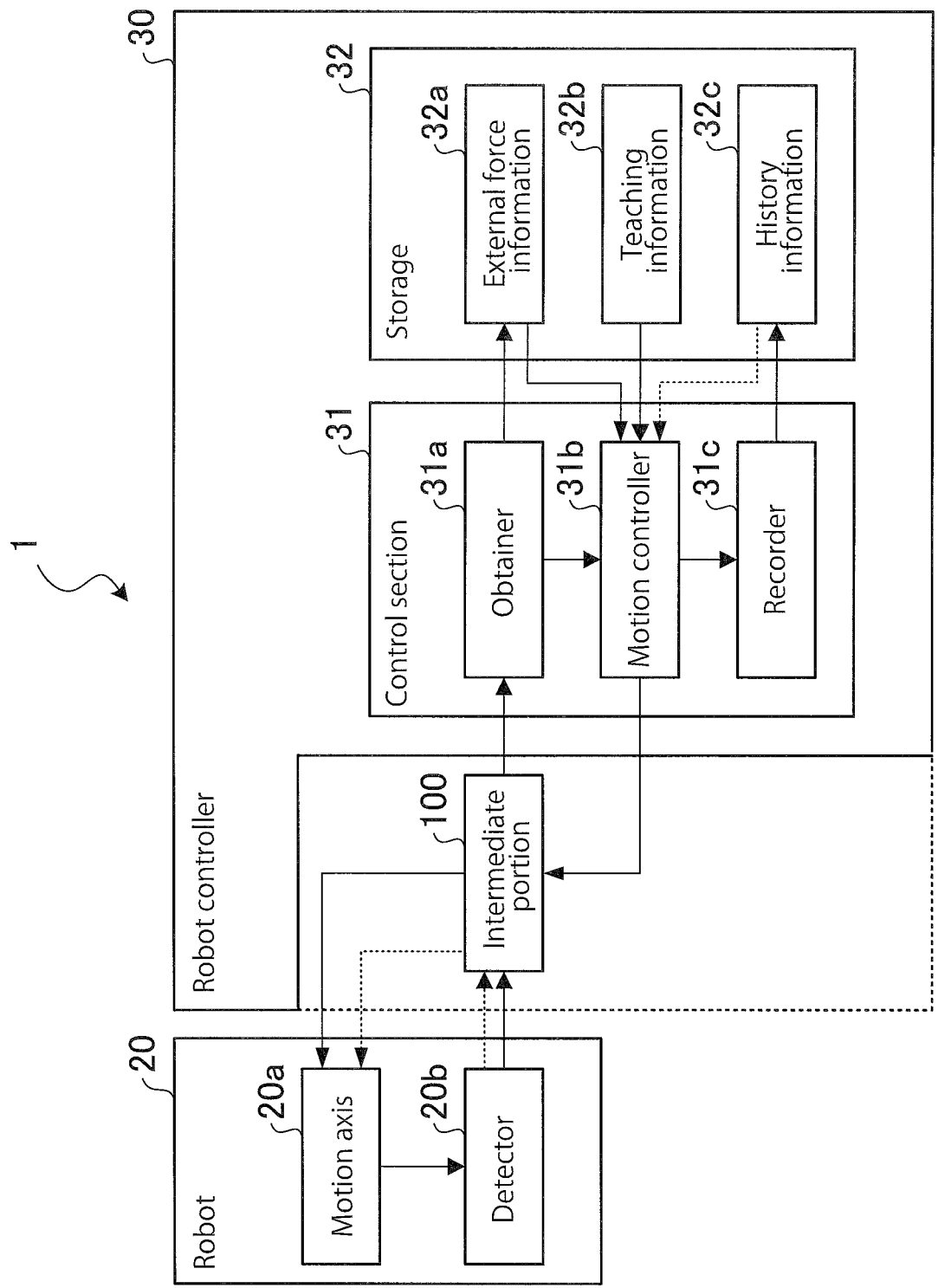
FIG. 3 is a block diagram illustrating a configuration of the robot system.

A configuration of the robot system 1 will be described by referring to FIG. 3. FIG. 3 is a block diagram illustrating a configuration of the robot system 1. As illustrated in FIG. 3, the robot system 1 includes the robot 20 and the robot controller 30. A configuration of the robot 20 is as described above by referring to FIG. 2. The following description is mainly regarding a configuration of the robot controller 30.

As illustrated in FIG. 3, the robot 20 is connected to the robot controller 30. The robot 20 includes the motion axes 20a and the detectors 20b. The robot system 1 includes intermediate portions 100. Each of the intermediate portions 100 are connected to one motion axis 20a and one detector 20b. The number of the intermediate portions 100 is the same as the number of combinations of the motion axes 20a and the detectors 20b. It is to be noted that the plurality of combinations of the motion axes 20a and the detectors 20b may be connected to a single intermediate portion 100.

Each intermediate portion 100 is a board-shaped controller insertable and removable to and from a slot of the robot controller 30. The intermediate portion 100 is communicatively connected to a control section 31 of the robot controller 30. When the external force detected by the detector 20b satisfies a "third condition", the intermediate portion 100 executes the "reflective withdrawal mode", which is to cause a motion axis 20a to move without intervention by the control section 31.

Details of the reflective withdrawal mode will be described later by referring to FIG. 4A, and the third condition will be described later by referring to FIG. 7. The intermediate portion 100 may be provided inside the robot 20 or in a housing other than the robot 20 and the robot controller 30.

The robot controller 30 includes the control section 31 and a storage 32. The control section 31 includes an obtainer 31a, a motion controller 31b, and a recorder 31c. The storage 32 stores external force information 32a, teaching information 32b, and history information 32c.

The robot controller 30 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the obtainer 31a, the motion controller 31b, and the recorder 31c of the control section 31.

At least one or all of the obtainer 31a, the motion controller 31b, and the recorder 31c may be implemented by hardware such as ASIC (Application Specific Integrated Circuit) and FPGA (Field Programmable Gate Array).

The storage 32 corresponds to the RAM and/or the HDD. The RAM and the HDD are capable of storing the external force information 32a, the teaching information 32b, and the history information 32c. It is to be noted that the robot controller 30 may obtain the above-described programs and various kinds of information from another computer connected to the robot controller 30 through a wired or wireless network or from a portable recording medium.

The control section 31 performs motion control of the robot 20. When the control section 31 controls the robot 20 to withdraw, the control section 31 executes the backward withdrawal mode and/or the external-force reduction withdrawal mode. The reflective withdrawal mode is executed by the intermediate portions 100, as described above. Based on an operation force effected by an operator, the control section 31 may perform a lead-through operation of changing the posture of the robot 20.

Through the intermediate portion 100, the obtainer 31a obtains the external force detected by the detector 20b. The obtainer 31a also outputs the obtained external force to the motion controller 31b and records the obtained external force in the external force information 32a in the storage 32. The external force information 32a will be described in detail later by referring to FIG. 8.

The motion controller 31b controls the robot 20 to move based on the teaching information 32b. The teaching information 32b is prepared in the teaching stage, in which the robot 20 is taught a motion, and contains "jobs" that constitute a program defining the motion path that the robot 20 follows.

The motion controller 31b also controls the robot 20 to make a withdrawal motion based on the external force information 32a. When the external force detected by the detector 20b satisfies the first condition, the motion controller 31b executes the backward withdrawal mode of causing the robot 20 to follow, in the backward direction, the motion track that the robot 20 followed.

There are two procedures in the backward withdrawal mode, namely: a procedure for causing the robot 20 to follow the path indicated in the history information 32c backward; and a procedure for playing the teaching information 32b backward. One of the procedures may be selected based on a setting value or another parameter input in advance. In both procedures, the motion controller 31b makes the motion speed of the robot 20 lower than a normal motion speed.

This configuration ensures that if an operator becomes caught between, for example, the tool 200 and some obstacle, the operator is able to more easily see the motion of the robot 20, enabling the operator to avoid becoming caught in somewhere else during the withdrawal mode. It is also possible to perform only one of the two procedures as a fixed procedure, omitting the other procedure. An example of the first condition will be described later by referring to FIG. 5.

Also, the motion controller 31b successively notifies the recorder 31c of a path that the robot 20 is actually following. The motion controller 31b performs feedback control using the external force (for example, an encoder value) detected by the detector 20b corresponding to the motion axis 20a (an actuator such as a rotational motor), which is the motive power source of the robot 20. In this manner, the motion controller 31b improves the motion accuracy of the robot 20.

When the execution situation of the backward withdrawal mode satisfies the second condition, the motion controller 31b executes the external-force reduction withdrawal mode of causing the robot 20 to withdraw by causing a motion axis 20a to move in a direction in which the external force detected by the detector 20b reduces. An example of the second condition will be described later by referring to FIG. 6.

The recorder 31c records log information in the history information 32c in the storage 32 at predetermined time intervals. The log information is associated with the path notified from the motion controller 31b. In the history information 32c, following pieces of information are aligned at predetermined intervals: the present time, the motion track TR of the representative point 10 illustrated in FIG. 1, and the posture of the robot 20 corresponding to the motion track TR.

Instruction procedures for the reflective withdrawal mode, the backward withdrawal mode, and the external-force reduction withdrawal mode will be described by referring to FIGS. 4A and 4B. FIGS. 4A and 4B are respectively a first diagram and a second diagram illustrating an instruction procedure for the withdrawal mode.

Figure 4A:
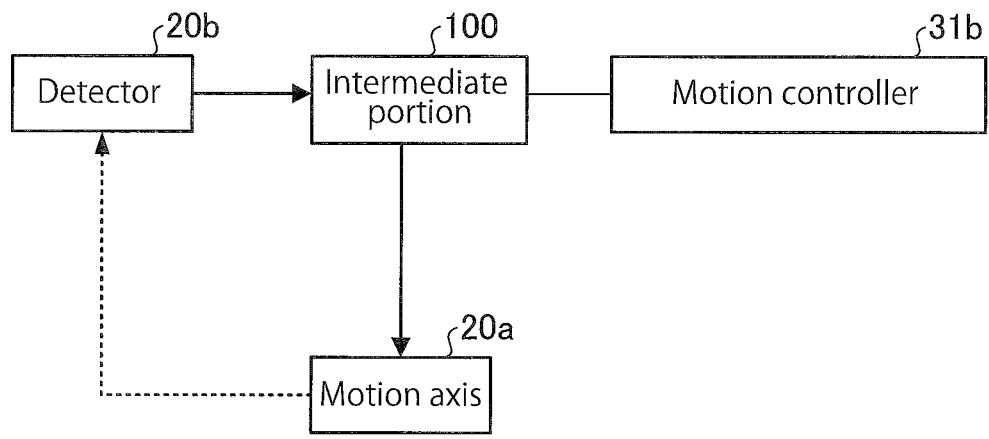
FIG. 4A is a first diagram illustrating an instruction procedure for a withdrawal mode.
Figure 4B:
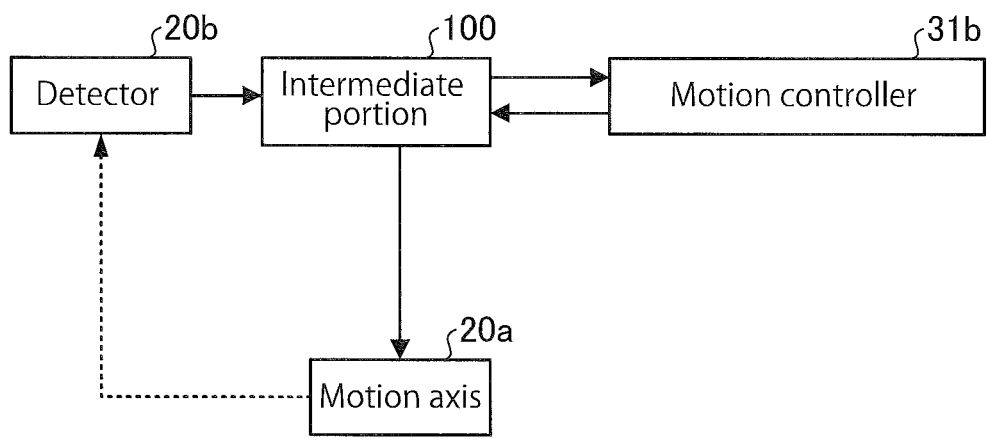
FIG. 4B is a second diagram illustrating the instruction procedure for the withdrawal mode

In FIGS. 4A and 4B, the solid line arrows indicate an instruction procedure performed after the detector 20b detects external force acting on the motion axis 20a (see the broken line in FIGS. 4A and 4B). FIG. 4A illustrates an instruction procedure for the reflective withdrawal mode, and FIG. 4B illustrates an instruction procedure for the backward withdrawal mode and an instruction procedure for the external-force reduction withdrawal mode.

As illustrated in FIG. 4A, in the reflective withdrawal mode, the intermediate portion 100 is notified of external force detected by the detector 20b. When the external force satisfies the third condition (detailed later by referring to FIG. 7), the intermediate portion 100 causes the motion axis 20a to move in a direction in which the external force reduces. More specifically, the intermediate portion 100 causes the motion axis 20a to move by a predetermined motion amount.

Thus, in the reflective withdrawal mode, the intermediate portion 100 causes the motion axis 20a to move without the motion controller 31b determining to do so. This enables the motion axis 20a to take a withdrawal motion more quickly than when the motion axis 20a is controlled by the motion controller 31b to take a withdrawal motion.

Among the motion axes 20a respectively corresponding to the vertical axis A0, the first axis A1, the second axis A2, the third axis A3, the fourth axis A4, and the fifth axis A5 of the robot 20 illustrated in FIG. 2, a motion axis 20a that is earliest to satisfy the third condition is caused to move. It is also possible to determine in advance a motion axis 20a that is caused to move in the reflective withdrawal mode.

As illustrated in FIG. 4B, in the backward withdrawal mode and the external-force reduction withdrawal mode, the motion controller 31b is notified, through the intermediate portion 100, of external force detected by the detector 20b. Then, the motion controller 31b determines which withdrawal mode to execute, and causes the motion axis 20a to move in the determined withdrawal mode through the intermediate portion 100. Making the motion controller 31b determine which withdrawal mode to execute improves the reliability of the withdrawal motion.

Specifically, when the received external force satisfies the first condition (detailed later by referring to FIG. 5), the motion controller 31b executes the backward withdrawal mode. In normal situations, executing the backward withdrawal mode releases the holding.

It is noted, however, that in order to improve the reliability in releasing the holding, the motion controller 31b monitors the execution situation of the backward withdrawal mode, and when the execution situation satisfies the second condition, the motion controller 31b executes the external-force reduction withdrawal mode. This improves the reliability of the withdrawal motion.

Figure 5:
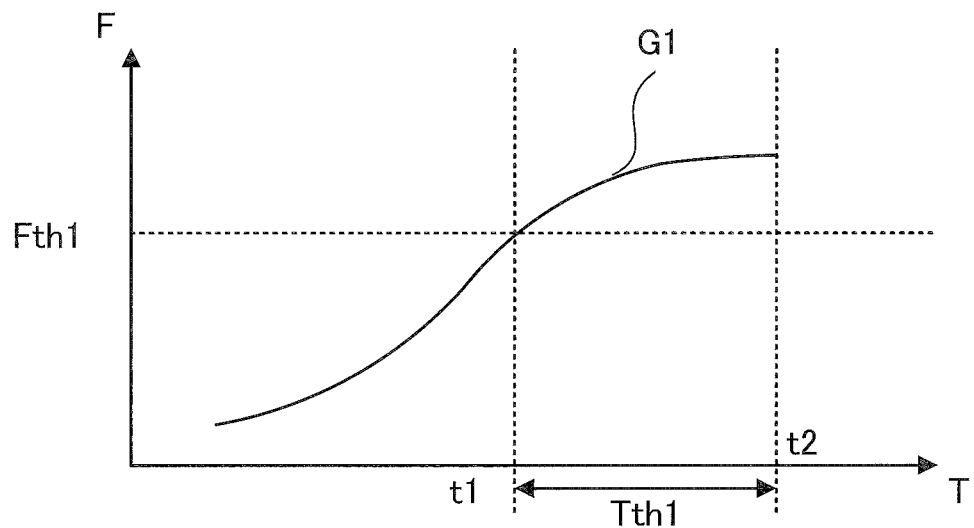
FIG. 5 illustrates an example first condition.
Figure 6:
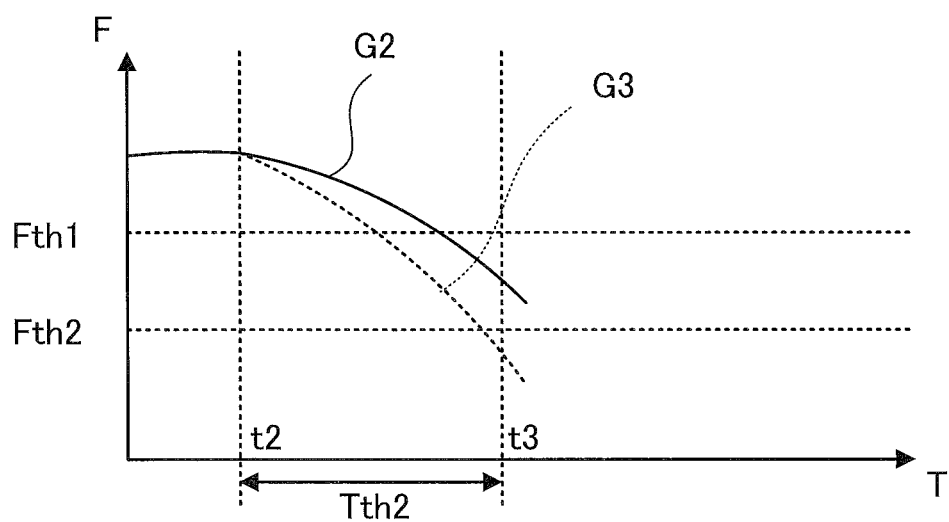
FIG. 6 illustrates an example second condition.

By referring to FIGS. 5 and 7, description will be made with regard to: the first condition and the second condition, which are associated with the motion controller 31b (see FIG. 3); and the third condition, which is associated with the intermediate portion 100 (see FIG. 3). FIG. 5 illustrates an example of the first condition. FIG. 6 illustrates an example of the second condition. FIG. 7 illustrates an example of the third condition. FIGS. 5 to 7 are two-dimensional graphs with external force (F) on the vertical axis against time (7) on the horizontal axis.

The first condition will be first described by referring to FIG. 5. The first condition is a condition for the motion controller 31b of the robot controller 30 to start executing the backward withdrawal mode. For example, the first condition is that the external force is equal to or more than a predetermined threshold before and after a predetermined period of time has passed. For further example, the first condition is that the external force is equal to or more than a predetermined threshold for a predetermined period of time.

Specifically, as illustrated in FIG. 5, assume that in graph G1 of change over time of the external force, the external force is equal to or more than threshold Fth1 at time t1. Then, assume that in the graph G1 the external force is equal to or more than the threshold Fth1 for the period between time t1 and time t2, which is later than time t1 by threshold Tth1 (t 2=t1+Tth1). In this case, the motion controller 31b determines that the external force satisfies the first condition. Upon making this determination, the motion controller 31b starts executing the backward withdrawal mode.

The first condition may be that the external force is equal to or more than the threshold Fth1. The first condition may also be that the external force reaches the threshold Fth1 and increases further beyond the threshold Fth1. That is, when there is an inclination toward an increasing external force, this inclination may be employed as the first condition. Thus, it suffices that the first condition is for determining whether a holding is occurring.

The second condition will be described by referring to FIG. 6. The second condition is a condition for the motion controller 31b of the robot controller 30 to start executing the external-force reduction withdrawal mode. For example, the second condition is that a predetermined period of time has passed since a holding unsolved situation was observed in the execution situation of the previously executed backward withdrawal mode. FIG. 6 illustrates a period of time including time t2 illustrated in FIG. 5. FIG. 6 also illustrates a threshold Fth2, which is smaller than the threshold Fth1.

As illustrated in FIG. 6, assume that in graph G2, the external force is equal to or more than the threshold Fth2 at time t3, which is later than time t2 by a threshold Tth2 (t 3=t 2+Tth2). In this case, the motion controller 31b determines that the holding unsolved situation is not overcome in the previously executed backward withdrawal mode. Upon making this determination, the motion controller 31b starts executing the external force reduce avoid mode.

Assume that in graph G3, the external force falls below the threshold Fth2 before time t3. In this case, the motion controller 31b determines that the holding unsolved situation is overcome in the previously executed backward withdrawal mode. When the motion controller 31b has made this determination, the motion controller 31b does not execute the external-force reduction withdrawal mode.

The second condition may be that the external force increases after the backward withdrawal mode has been executed. The second condition may also be that a predetermined period of time has passed since the external force exceeded the threshold Tth1. Thus, it suffices that the second condition is for determining whether a holding unsolved situation is overcome. It is also possible for the motion controller 31b to execute the backward withdrawal mode alone, omitting the second condition.

The third condition will be described by referring to FIG. 7. The third condition is a condition for the intermediate portion 100 (see FIG. 3) to start executing the reflective withdrawal mode. For example, the third condition is that the external force is equal to or more than a predetermined threshold. FIG. 7 illustrates time t3, which is earlier than time U illustrated in FIG. 5. FIG. 7 also illustrates a threshold Fth3, which is smaller than the threshold Fth1.

Figure 7:
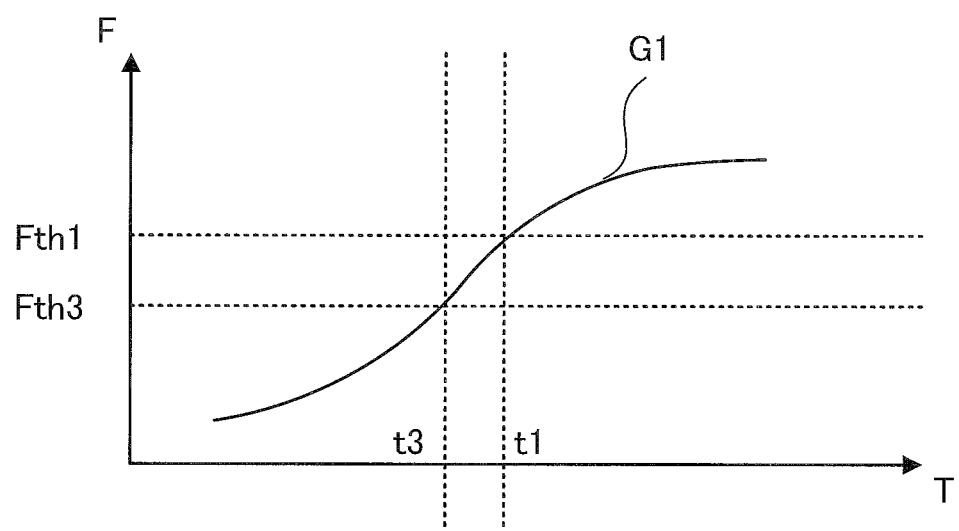
FIG. 7 illustrates an example third condition.

Specifically, as illustrated in FIG. 7, assume that in graph G1 of change over time of the external force, the external force is equal to or more than the threshold Fth3 (which is smaller than the threshold Fth1 illustrated in FIG. 5) at time t3 (which is earlier than time t1 illustrated in FIG. 5). In this case, the intermediate portion 100 determines that the external force satisfies the third condition. Upon making this determination, the motion controller 31b starts executing the reflective withdrawal mode. This increases the reliability with which the reflective withdrawal mode, which is executed by the intermediate portions 100, is executed earlier than the backward withdrawal mode, which is executed by the motion controller 31b.

The third condition may be the same as the first condition. In this case, it looks as if the reflective withdrawal mode by the intermediate portion 100 and the backward withdrawal mode by the motion controller 31b are executed simultaneously. In actual situations, however, the reflective withdrawal mode is executed earlier than the backward withdrawal mode. This is because the intermediate portion 100 is capable of executing the withdrawal motion more quickly than under the control of the motion controller 31b, as described above by referring to FIGS. 4A and 4B.

An example of the external force information 32a illustrated in FIG. 3 will be described by referring to FIG. 8. FIG.

8 illustrates an example of the external force information 32a. FIG. 8 illustrates: identification number of each of the axes (the vertical axis A0, the first axis A1, the second axis A2, the third axis A3, the fourth axis A4, and the fifth axis A5) of the robot 20 illustrated in FIG. 2; external force value corresponding to each identification number and updated at any desired timing by the obtainer 31a (see FIG. 3); and preset motion amount corresponding to each identification number. The following description is under the assumption that the motion controller 31b (see FIG. 3) executes the external-force reduction withdrawal mode based on the external force information 32a.

Figure 8:
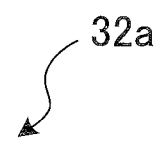
FIG. 8 illustrates an example of external force information.

As illustrated in FIG. 8, assume that the external force value of the vertical axis A0 is "0"; the external force value of the first axis A1 is "200"; the external force value of the second axis A2 is "50"; the external force value of the third axis A3 is "0"; the external force value of the fourth axis A4 is "100"; and the external force value of the fifth axis A5 is "0". Also as illustrated in FIG. 8, assume that the motion amount of the vertical axis A0 is "m0"; the motion amount of the first axis A1 is "m1"; the motion amount of the second axis A2 is "m2"; the motion amount of the third axis A3 is "m3"; the motion amount of the fourth axis A4 is "m4"; and the motion amount of the fifth axis A5 is "m5".

In this case, the first axis A1 has the largest external force value, and the motion controller 31b controls the motion axis 20a corresponding to the first axis A1 to move in the external-force reduction withdrawal mode. Then, the motion controller 31b restricts the motion amount of the motion axis 20a to "m1". The motion amount may be the number of pulses transmitted to the motion axis 20a, or may be the period of time for which the motion axis 20a is caused to move.

While in the above description the motion axis 20a with the largest external force value is caused to move, this configuration is not intended in a limiting sense. Another possible embodiment is that a predetermined number of motion axes 20a with larger external force values are caused to move. Still another possible embodiment is that the intermediate portions 100 refer to the external force information 32a illustrated in FIG. 8 without intervention by the motion controller 31b, and that one intermediate portion 100 corresponding to the motion axis 20a with the largest external force value executes the reflective withdrawal mode.

Figure 9:
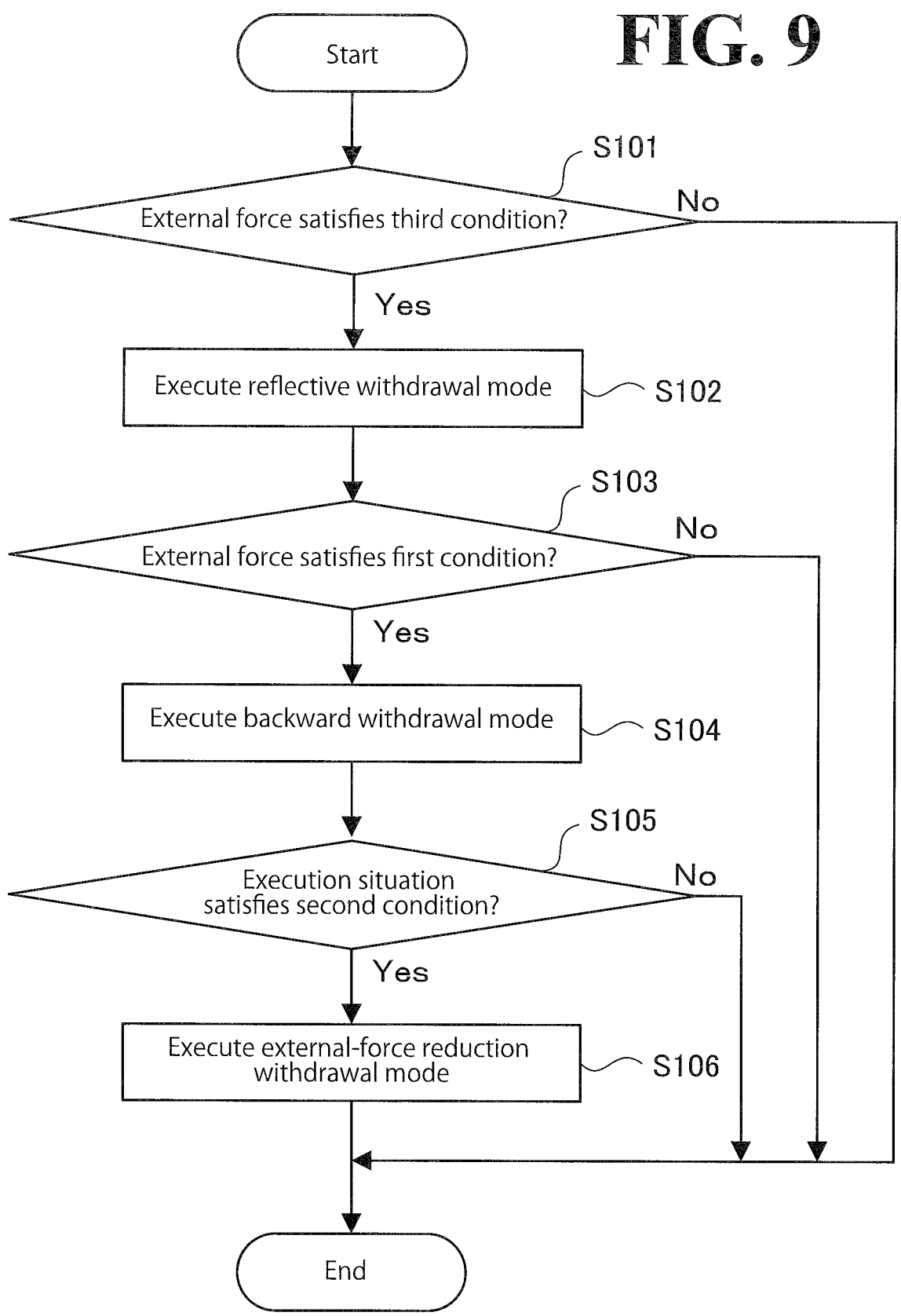
FIG. 9 is a flowchart of a procedure for processing performed by the robot system.

A processing procedure for the withdrawal mode executed by the robot system 1 (see FIG. 3) will be described by referring to FIG. 9. FIG. 9 is a flowchart of a procedure for processing performed by the robot system 1. While in the processing procedure illustrated in FIG. 9 the robot system 1 first executes the reflective withdrawal mode and then executes the backward withdrawal mode, the reflective withdrawal mode may be omitted.

As illustrated in FIG. 9, the intermediate portion 100 determines whether the external force detected by the detector 20b satisfies the third condition (step S101). When the intermediate portion 100 has determined that the external force satisfies the third condition (Yes at step S101), the intermediate portion 100 executes the reflective withdrawal mode (step S102). When the condition at step S101 is not satisfied (No at step S101), the entire processing ends.

Next, the motion controller 31b of the robot controller 30 determines whether the external force satisfies the first condition (step S103). When the motion controller 31b has determined that the external force satisfies the first condition (Yes at step S103), the motion controller 31b executes the backward withdrawal mode (step S104). When the condition at step S103 is not satisfied (No at step S103), the entire processing ends.

Next, the motion controller 31b of the robot controller 30 determines whether the execution situation of the backward withdrawal mode satisfies the second condition (step S105). When the motion controller 31b has determined that the execution situation satisfies the second condition (Yes at step S105), the motion controller 31b executes the external-force reduction withdrawal mode (step S106). When the condition at step S105 is not satisfied (No at step S105), the entire processing ends.

As has been described hereinbefore, the robot system 1 according to this embodiment includes the robot 20, the detector 20b, and the robot controller 30. The robot 20 includes a plurality of motion axes 20a. The detector 20b detects an external force acting on the robot 20. The robot controller 30 controls motions of the robot 20.

The robot controller 30 includes the motion controller 31b. When the external force detected by the detector 20b satisfies the first condition, the motion controller 31b executes the backward withdrawal mode of causing the robot 20 to withdraw by following, in the backward direction, the motion track that the robot 20 followed. When the execution situation of the backward withdrawal mode satisfies the second condition, the motion controller 31b executes the external-force reduction withdrawal mode of causing the robot 20 to withdraw in a direction in which the detected external force reduces.

Thus, the robot system 1 executes the backward withdrawal mode of causing the robot 20 to follow, in the backward direction, the motion track that the robot 20 followed, and occasionally executes the external-force reduction withdrawal mode of causing the robot 20 to withdraw in a direction in which the detected external force reduces. With this configuration, the robot system 1 enables the robot 20 to make a withdrawal motion more reliably.

While in the above-described embodiment the robot 20 is a 6-axis robot, the robot 20 may be a robot having 20 or more axes or may be a robot having equal to or less than 7 axes. While in the above-described embodiment the detector 20b is provided for each of the motion axes 20a of the robot 20, there may be some motion axes 20a without detectors 20b.

In another possible embodiment, upon detection of an external force by the detector 20b, it is possible to temporarily stop the robot 20 and then cause the robot 20 to take the above-described withdrawal motion. In this case, the robot 20 is stopped under the condition that the external force has reached a threshold. The threshold may be the threshold Fth1 illustrated in FIG. 5 and other drawings or may be a value smaller than the threshold Fth1.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A robot system comprising:
a robot having a plurality of motion axes;
a plurality of sensors configured to detect an external force acting on the robot, the plurality of sensors being provided at the plurality of motion axes, respectively; and a processor configured to:
move the robot in a forward direction such that a representative point of the robot moves along a motion track in the forward direction;
move the robot in a reverse direction such that the representative point moves along the motion track in the reverse direction opposite to the forward direction when the external force satisfies a first condition which includes a condition that the external force is larger than a first threshold force; and
move the robot to reduce the external force when the external force satisfies a second condition which includes a condition that the external force is larger than a second threshold force even after the robot has been moved in the reverse direction, the robot being moved to reduce the external force by moving one motion axis among the plurality of motion axes corresponding to a sensor among the plurality of sensors that detected a largest external force, among a plurality of external forces detected by respective sensors of the plurality of sensors, in a direction in which the largest external force reduces.

2. The robot system according to claim 1, wherein the first condition includes a condition that a period of time during which the external force is larger than the first threshold force is longer than a threshold period of time.

3. The robot system according to claim 1, wherein the first condition includes a condition that the external force increases after the external force becomes larger than the first threshold force.

4. The robot system according to claim 1, wherein the second condition includes another condition that the external force increases even after the robot has been moved in the reverse direction.

5. The robot system according to claim 1, wherein the second threshold force is smaller than the first threshold force.

6. The robot system according to claim 1, wherein the second condition includes another condition that a period of time during which the external force is larger than the first threshold force is longer than a threshold period of time even after the robot has been moved in the reverse direction.

7. The robot system according to claim 1, further comprising:
an intermediate controller provided between the sensor and the processor to be connected to the sensor and the processor,
wherein the intermediate controller is configured to move the robot to reduce the external force when the external force is larger than a third threshold force.

8. The robot system according to claim 7, wherein the intermediate controller is configured to move the robot by a predetermined distance.

9. The robot system according to claim 7, wherein the processor is configured to move the robot in the reverse direction when the external force satisfies the first condition after the intermediate controller has moved the robot to reduce the external force.

10. The robot system according to claim 1, further comprising:
a memory to store the motion track in the forward direction,
wherein the processor is configured to move the robot in the reverse direction when the external force satisfies the first condition such that the representative point moves along the motion track stored in the memory.

11. The robot system according to claim 1, wherein the processor is configured to move the robot in the reverse direction when the external force satisfies the first condition such that the representative point moves along the motion track according to teaching information based on which the robot is controlled to be moved.

12. The robot system according to claim 1, wherein the processor is configured to decrease a motion speed of the robot when the robot is moved in the reverse direction when the external force satisfies the first condition.

13. A robot controller comprising:
a processor configured to:
move a robot in a forward direction such that a representative point of the robot moves along a motion track in the forward direction, the robot having a plurality of motion axes and a plurality of sensors configured to detect an external force acting on the robot, the plurality of sensors being provided at the plurality of motion axes, respectively;
move the robot in a reverse direction such that the representative point moves along the motion track in the reverse direction opposite to the forward direction when the external force satisfies a first condition which includes a condition that the external force is larger than a first threshold force; and
move the robot to reduce the external force when the external force satisfies a second condition which includes a condition that the external force is larger than a second threshold force even after the robot has been moved in the reverse direction, the robot being moved to reduce the external force by moving one motion axis among a plurality of motion axes corresponding to a sensor among a plurality of sensors that detected a largest external force, among a plurality of external forces detected by respective sensors of the plurality of sensors, in a direction in which the largest external force reduces.

14. A method for controlling a robot, comprising:
moving a robot in a forward direction such that a representative point of the robot moves along a motion track in the forward direction, the robot having a plurality of motion axes and a plurality of sensors configured to detect an external force acting on the robot, the plurality of sensors being provided at the plurality of motion axes, respectively;
moving the robot in a reverse direction such that the representative point moves along the motion track in the reverse direction opposite to the forward direction when the external force satisfies a first condition which includes a condition that the external force is larger than a first threshold force; and
moving the robot to reduce the external force when the external force satisfies a second condition which includes a condition that the external force is larger than a second threshold force even after the robot has been moved in the reverse direction, the robot being moved to reduce the external force by moving one motion axis among the plurality of motion axes corresponding to a sensor among the plurality of sensors that detected a largest external force, among a plurality of external forces detected by respective sensors of the plurality of sensors, in a direction in which the largest external force reduces.

15. The robot system according to claim 1, wherein the representative point is provided on the robot.

16. The robot system according to claim 1,
wherein the robot comprises at least one arm and a wrist which is connected to the at least one arm and to which a tool is connectable, and
wherein the representative point is provided on the wrist.

17. The robot system according to claim 1,
wherein the robot comprises at least one arm and a tool connected to the at least one arm, and
wherein the representative point is provided on the tool.

* * * * *